(12) United States Patent
Olafsson (10) Patent No.: US 6,985,566 B2
(45) Date of Patent: Jan. 10, 2006

(54) POINT OF SALE MODEM FOR HIGH-SPEED COMMUNICATIONS

(75) Inventor: Sverrir Olafsson, Reykjavik (IS)

(73) Assignee: Conexant Systems, Inc., Newportt Beach, CA (US)

( * ) Notice: Subject to any disclaimer, the term of this patent is extended or adjusted under 35 U.S.C. 154(b) by 322 days.

(21) Appl. No.: 10/352,754

(22) Filed: Jan. 28, 2003

(65) Prior Publication Data

US 2004/0148225 A1    Jul. 29, 2004

(51) Int. Cl.
*H04M 11/00*    (2006.01)

(52) U.S. Cl. .............................. 379/93.31; 379/93.12; 379/93.32

(58) Field of Classification Search ............. 379/93.31, 379/93.32, 93.12, 93.01, 93.08, 93.28; 375/222
See application file for complete search history.

(56) References Cited

U.S. PATENT DOCUMENTS

| | | | |
|---|---|---|---|
| 5,870,438 A | 2/1999 | Olafsson | |
| 6,314,170 B1 * | 11/2001 | Noguchi et al. | 379/93.32 |
| 6,449,349 B1 * | 9/2002 | Higuchi | 379/93.32 |

OTHER PUBLICATIONS

"A Modem Operating at Data Signalling Rates of Up to 33 600 Bit/s for Use on the General Switched Telephone Network and On Leased Point-to-Point 2-Wire Telephone-Type Circuits" International Telecommunication Union, ITU-T Recommendation V.34, Feb. 1998.

* cited by examiner

*Primary Examiner*—Stella Woo
(74) *Attorney, Agent, or Firm*—Farjami & Farjami LLP (57) ABSTRACT

A fast train protocol for use by a high-speed point of sale (POS) modem is disclosed. In one aspect, the fast train protocol may include he following exemplary steps: receiving an instruction to connect to a remote modem; transmitting a tonal signal to the remote modem for a pre-determined period of time in response to receiving the instruction, where the tonal signal identifies the POS modem as being capable of supporting the fast train protocol; receiving an S signal from the remote modem in response to transmitting the tonal signal; receiving an S\ signal from the remote modem following receiving the S signal; receiving one or more remote PP signals from the remote modem following receiving the S\ signal; and receiving a remote parameter sequence from the remote modem following receiving the one or more remote PP signals.

78 Claims, 5 Drawing Sheets

POINT OF SALE MODEM FOR HIGH-SPEED COMMUNICATIONS

BACKGROUND OF THE INVENTION

1. Field of the Invention

The present invention relates generally to modems and, more particularly, to modem training protocols for use by modems in point of sale terminals.

2. Related Art

Today, point of sale ("POS") terminals are in use by various merchants throughout the country and enable convenient replacements for cash transactions. The POS terminals have become the preferred way of processing credit cards, debit cards, checks, smart chip cards, electronic benefits transfer, and other electronically submitted transactions in a traditional retail environment. The POS terminals are typically used in face-to-face transactions, where merchants swipe the customers' cards through the POS terminal or key-in payment information into the POS terminal. In turn, the POS terminal uses a POS modem to establish a connection with a service provider modem coupled to a financial service provider computer. The POS modem transmits the card information, transaction amount, etc. and receives an acceptance or rejection of the requested transaction from the financial service provider computer via the service provider modem.

Figure 1:
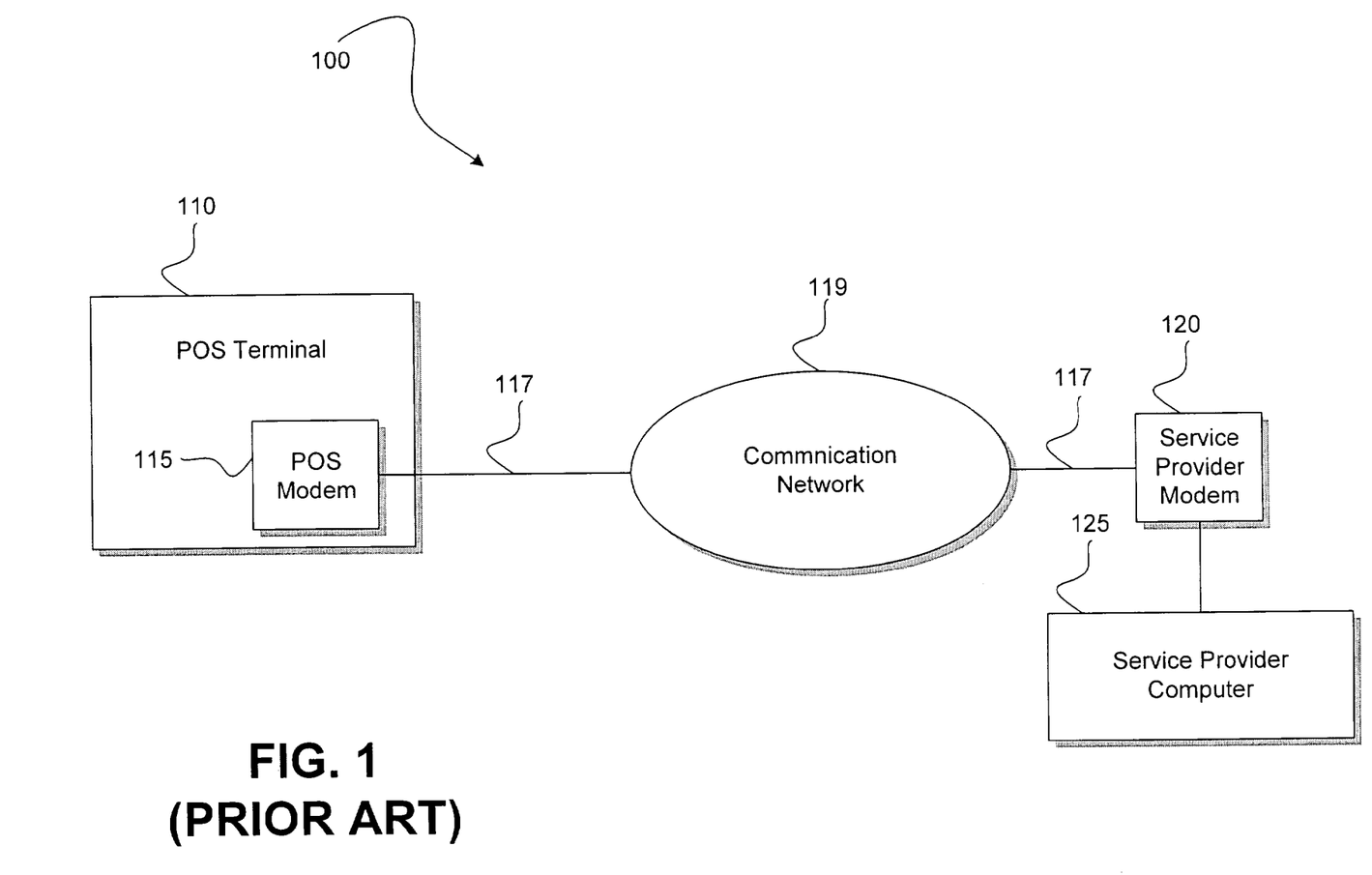
FIG. 1 illustrates a conventional point of sale system.

FIG. 1 illustrates conventional POS system 100 including POS terminal 110, where POS terminal 110 includes POS modem 115 coupled to communication line 117, such as a telephone line. As shown, communication line 117 passes through communication network 119, such as the Public Switched Telephone Network ("PSTN"), which can provide a communication link between POS modem 115 and service provider modem 120. As further shown in FIG. 1, service provider modem 120 is in communication with service provider computer 125, such as a computer used by financial institutions for processing financial transactions.

As briefly discussed above, POS terminal 110 is capable of receiving the transaction amount and the card information, such as credit card number, expiration date, name, etc., and is further capable of transmitting the same data using POS modem 115 to service provider modem 120. At the other end, service provider modem 120 provides such data to service provider computer 125 for determining whether the requested transaction may take place. After service provider computer 124 makes such determination, service provider's acceptance or rejection of the requested transaction is transmitted to POS modem 115 via service provider modem 120.

In the past, due to the small amount of data that was needed to be transferred between POS modem 115 and service provider modem 120 (such data as the transaction amount, the card information, e.g. credit card number, expiration date, name, etc., which require a small number of data bytes), low speed modems running at 300–2400 bits-per-second (bps) were successfully utilized for processing POS transactions. Also, in order to further reduce the communication time between POS modem 115 and service provider modem 120, the standard modem training schemes, such as FSK (V.21, V.23 and Bell 103), PSK (V.22 and Bell 212A) and QAM (V.22bis) have been modified to shorten such modem training schemes for particular use in POS system 100.

For example, according to one FSK training scheme, POS modem 115 detects answer tone (2100 Hz or 2225 Hz) for only about 100 ms before starting to send FSK idle marks. While transmitting the FSK idle marks, POS modem 115 must be able to detect (1) no signal (quiet line), (2) PSK carrier, or (3) answer tone. POS modem 115 receiver must also be able to synchronize with FSK idle marks from service provider modem 120 within 100 ms after such FSK idle marks are present. Subsequently, POS modem 115 and service provider modem 120 enter data mode to receive and transmit data. Accordingly, as understood by those skilled in the art, the FSK training scheme is substantially reduced in time.

As POS systems have evolved, more and more data need to be communicated between POS modem 115 and service provider modem 120 and, thus, low-speed communication at 300 bps–2400 bps causes too much delay even if the training time is substantially reduced, since the data is still transferred at low speeds. For example, today, images and coupons may be sent from service provider modem 120, which require a substantial amount of data to be transferred from service provider modem 120 to POS modem 115. As a result, special attention has been focused on the use of faster data rates to transfer data between POS modem 115 and service provider modem 120. However, because faster data rates require substantially longer training time, use of faster data rates has not been viewed as an optimistic replacement for the existing low-speed POS terminals in the industry.

In a recent move to use faster data rates for POS terminals, one camp has set forth a modified V.29 training scheme, which shortens the V.29 training scheme. V.29 is an ITU standard (1976), which is a half-duplex facsimile scheme that can support speeds of 4,800 bps, 7,200 bps and 9,600 bps using QAM modulation, and has been adapted for Group 3 facsimile transmission over dial-up lines. However, the modified V.29 training scheme has many shortcomings. For example, the training time for the modified V.29 training scheme may take about 1–2 seconds. Further, the modified V.29 scheme is limited to a maximum data rate of 9,600 bps, which is still too slow and time consuming for transferring large amounts of data. Even more, the modified V.29 training only supports a half-duplex data mode.

Therefore, there is an intense need in the art for a high-speed data communications protocol designed to satisfy the requirements of the present and evolving POS systems, and which can provide fast training time, speeds of greater than 9,600 bps, full-duplex operations, and more.

SUMMARY OF THE INVENTION

In accordance with the purpose of the present invention as broadly described herein, there is provided a variety of exemplary embodiments of a high-speed point of sale (POS) modem capable of use by a POS terminal for connection to a remote modem over a communication line. In one aspect of the present invention, the POS modem executes a fast train method comprising the steps of: receiving an instruction to connect to the remote modem; transmitting a tonal signal to the remote modem for a pre-determined period of time in response to receiving the instruction, where the tonal signal identifies the POS modem as being capable of supporting the fast train method; receiving an S signal from the remote modem in response to transmitting the tonal signal; receiving an S\ signal from the remote modem following receiving the S signal; receiving one or more remote PP signals from the remote modem following receiving the S\ signal; and receiving a remote parameter sequence from the remote modem following receiving the one or more remote PP signals.

The tonal signal may be a single frequency 980 Hz tone with a V.34POS identification signal superimposed on the single frequency 980 Hz tone, and three PP signals may be received during the step of receiving the one or more remote PP signals.

Further, the POS modem includes an equalizer, and the fast train method may further comprise the step of training the equalizer on the one or more remote PP signals. Also, the remote parameter sequence may include one or more of the following parameters: remote data rate choices, remote symbol rate choices, remote trellis coding choices, remote full-duplex options, remote transmit level adjustment, remote pre-emphasis and remote precoder taps.

In a further aspect, the fast train method may comprise the following additional steps: receiving remote data from the remote modem following receiving the remote parameter sequence; transmitting one or more POS PP signals to the remote modem following receiving the remote data; training an echo canceller of the POS modem during transmitting the one or more POS PP signals; transmitting a POS parameter sequence to the remote modem following transmitting the one or more POS PP signals, where the POS parameter sequence may include one or more of the following parameters: POS data rate choices, POS symbol rate choices, POS trellis coding choices, POS full-duplex options, POS transmit level adjustment, POS pre-emphasis and POS precoder taps; transmitting POS data to the remote modem following transmitting the POS parameter sequence; fine training and evaluating the echo canceller during transmitting the POS data; receiving the one or more remote PP signals from the remote modem after transmitting the POS data; receiving a remote full-duplex capability indicator signal from the remote modem following receiving the one or more remote PP signals from the remote modem after transmitting the POS data; transmitting the one or more POS PP signals to the remote modem after receiving the remote full-duplex capability indicator signal; transmitting a POS full-duplex capability indicator signal following transmitting the one or more POS PP signals to the remote modem after receiving the remote full-duplex capability indicator signal; and entering a full-duplex data mode.

In one aspect, the POS modem may not transmit the S signal and the S/ signal. Further, in another aspect, the POS modem may not exchange full-duplex capability indicator signals and may remain in the half-duplex mode of operation.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using an analog modem, the present invention may be implemented in other communication devices interfacing with any communication medium. Indeed, for the sake of brevity, conventional analog circuit, circuit components, data transmission, tone generation and detection, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections might be present in a practical communication system.

Figure 2:
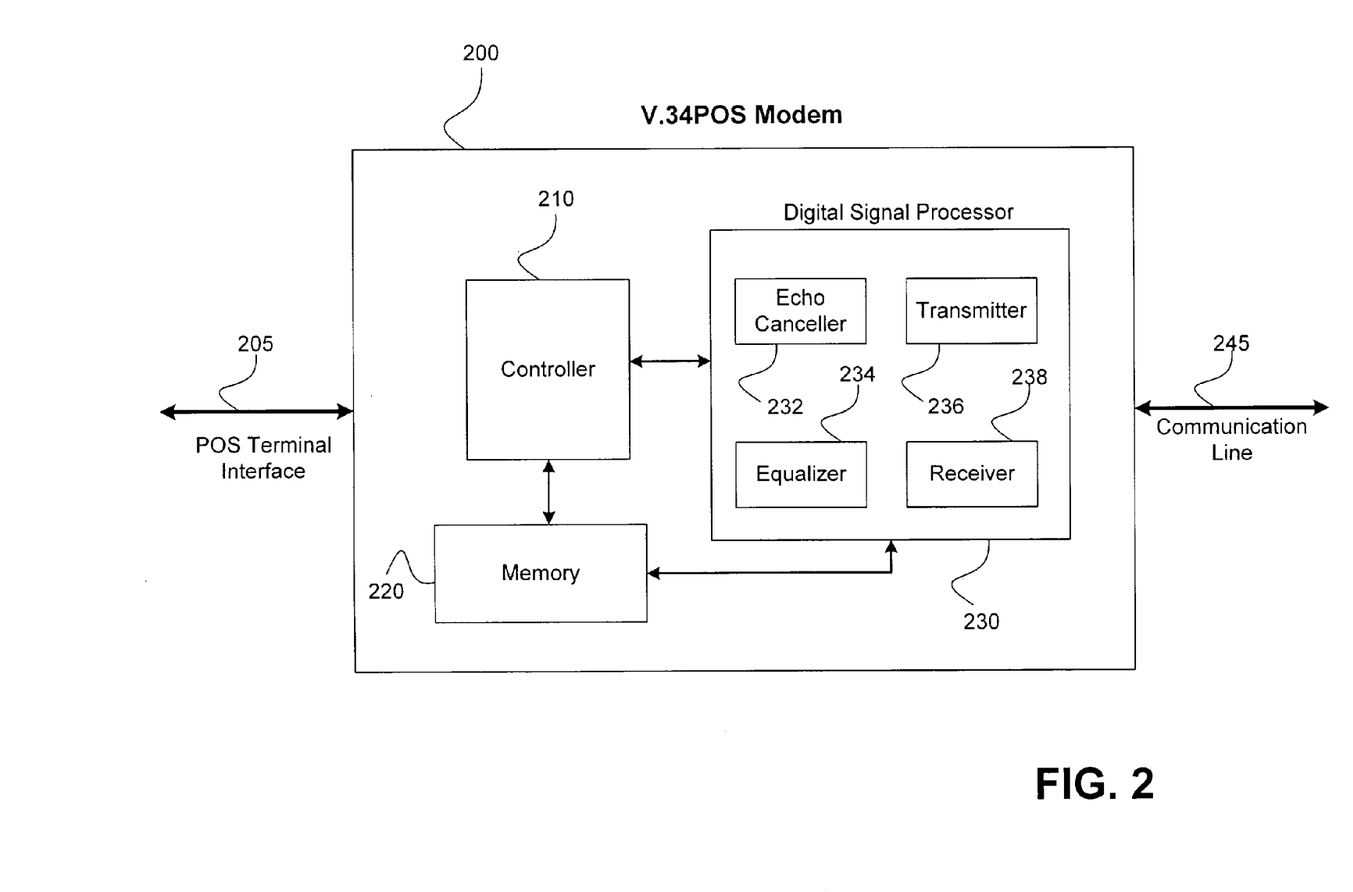
FIG. 2 illustrates a high-speed POS modem according to one embodiment of the present invention.

FIG. 2 illustrates a high-speed POS modem, such as V.34POS modem 200, according to one embodiment of the present invention. As shown, V.34POS modem 200 includes controller 210, memory 220 and digital signal processor 230. Controller 210 can be any microprocessor and controls the general operation of V.34POS modem 200. For example, controller 210 monitors and manages POS terminal interface 205, such as receipt and transmission of data over POS terminal interface 205. In one embodiment, controller 210 may include a UART (Universal Asynchronous Receiver Transmitter), in which event, controller 210 may buffer receive and transmit data in memory 220 temporarily. In other embodiments, controller 210 may provide a direct path for synchronous data to flow between digital signal processor 230 and POS terminal interface 205.

Memory 220 may include one or more types of memory. For example, memory 200 may include an EPROM, EEPROM or flash memory for storing one or more programs for execution by controller 210 and/or digital signal processor 230. In one embodiment, the code for POS fast train may reside in memory 220 for execution by digital signal processor 230. In addition, memory 220 may include RAM for use by controller 210 and digital signal processor 230.

As shown, digital signal processor 230 may include echo canceller 232, equalizer 234, transmitter 236 and receiver 238. Echo canceller 232 may be any known echo canceller that can be configured to produce an echo estimate based on the transmit signal that can cancel the echo portion of the received signal. Echo canceller 232 is thus used by digital signal processor 230 to eliminate any echo signals resulting from transmitted signals reflecting back from the telephone line and getting added to the desired receive signal. Equalizer 234 may also be any known equalizer, which can be configured to reduce amplitude distortion and compensate for phase distortion over communication line 245. Transmitter 236 can be configured to support the POS fast train and to transmit the data received from POS terminal interface 205 over communication line 245. Transmitter 236 can be configured to encode the data and perform digital-to-analog conversion prior to the transmission of the data over communication line 245. In one embodiment, transmitter 236 may perform various encoding functions and other functions set forth in the ITU-T Recommendation V.34 ("A modem operating at data signaling rates of up to 33,600 bit/s for use on the general switched telephone network and on leased point-to-point 2-wire telephone-type circuits, 02/98"), which is hereby incorporated by reference in its entirety. Receiver 238 can be configured to support the POS fast train and to receive data over communication line 245. Receiver 238 can be configured to perform analog-to-digital conversion and decode the data after reception from communication line 245. In one embodiment, receiver 238 may perform various decoding functions and other functions set forth in the ITU-T Recommendation V.34.

Figure 3A:
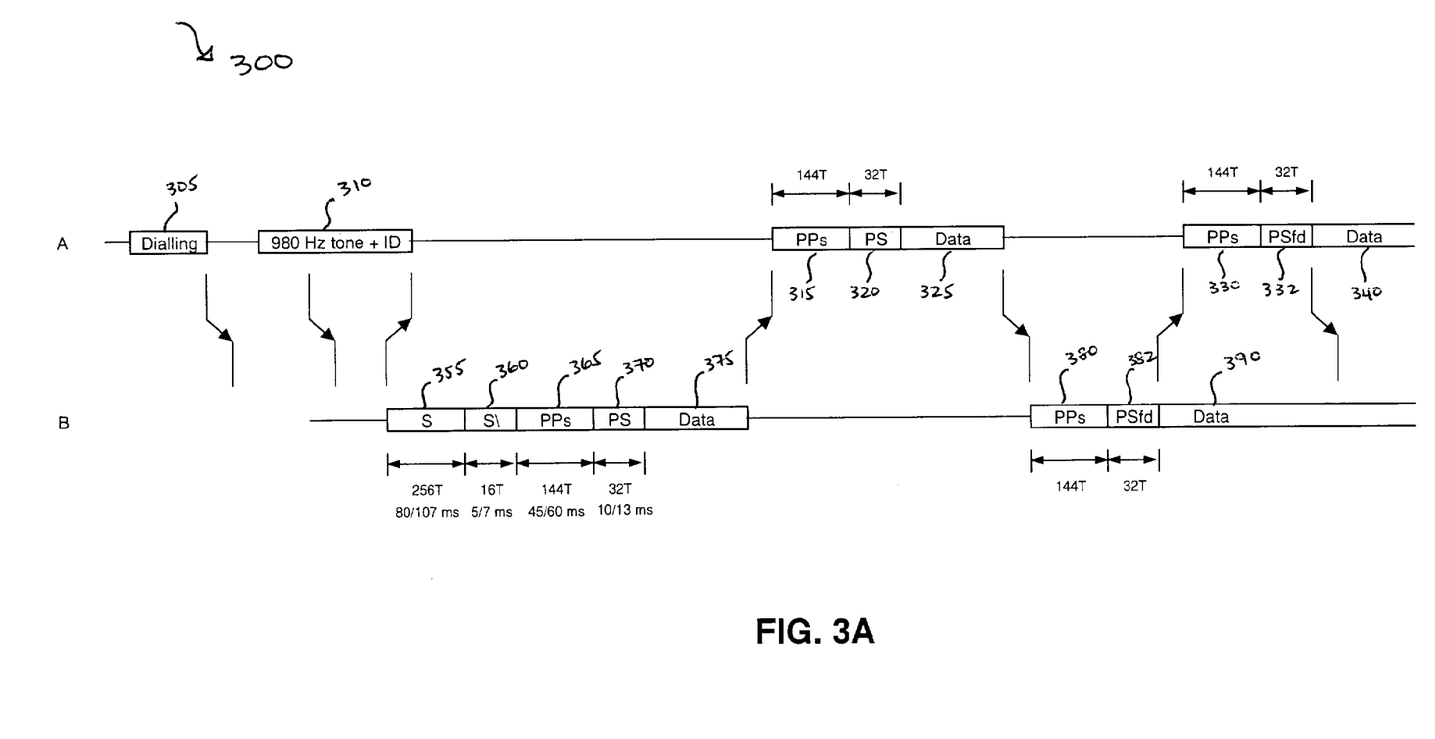
FIG. 3A illustrates a timing diagram of a POS fast train full-duplex protocol for use by the high-speed POS modem of FIG. 2.
Figure 3B:
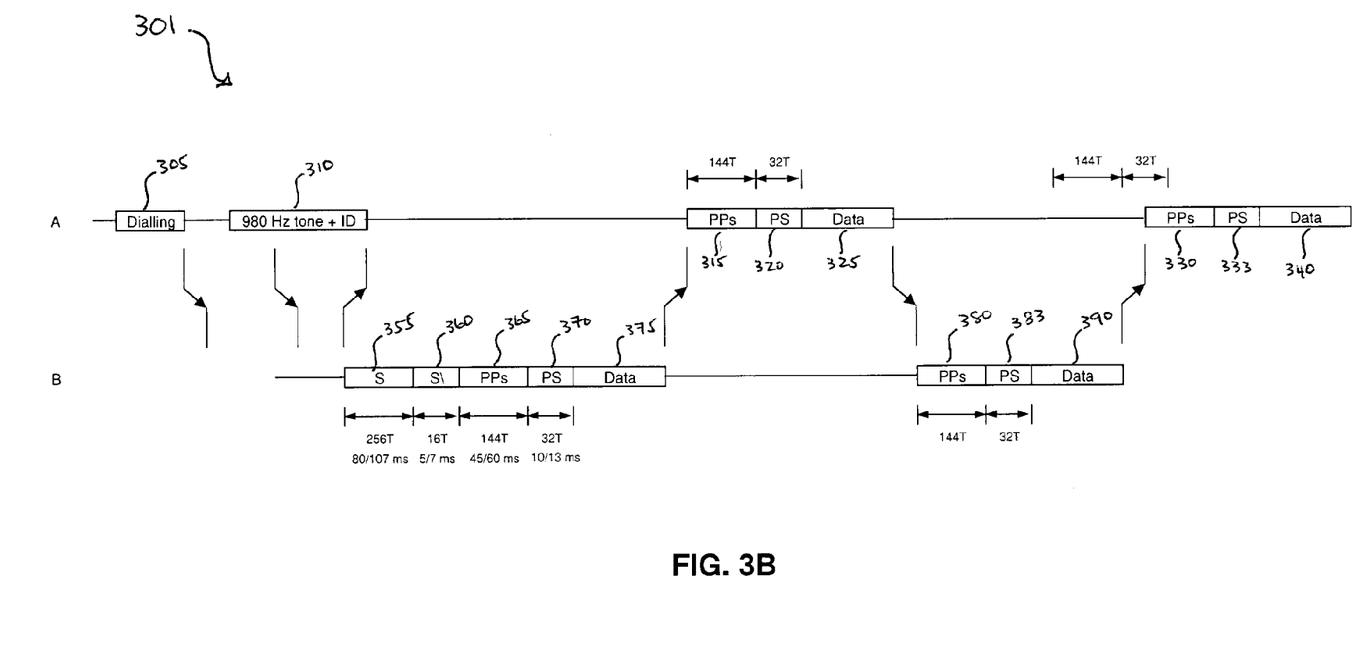
FIG. 3B illustrates a timing diagram of a POS fast train half-duplex protocol for use by the high-speed POS modem of FIG. 2.
Figure 4:
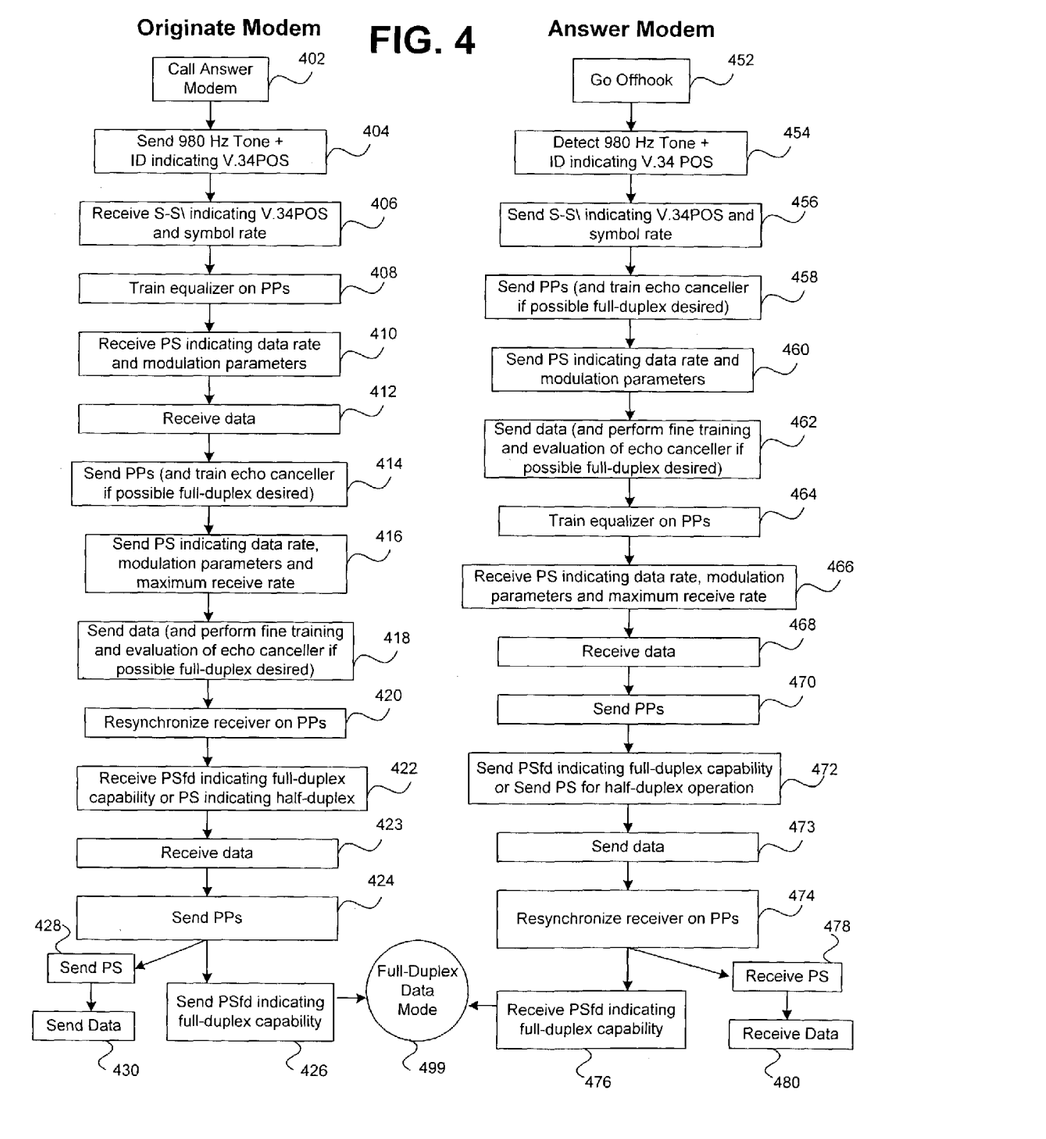
FIG. 4 illustrates a flow diagram of the POS fast train protocol of FIGS. 3A and 3B.

FIG. 3A illustrates a timing diagram for fast train full-duplex protocol 300 based on V.34 training protocol, and FIG. 3B illustrates a timing diagram for fast train half-duplex protocol 301 based on V.34 training protocol. FIGS. 3A, 3B and 4 will be discussed below in order to describe fast train protocols 300 and 301, according to one embodiment of the present invention. As shown, the originate modem or modem A, originates a call to answer modem or modem B upon receiving an instruction from the point of sale terminal, by dialing 305 a number at step 402. Next, at step 404, originate modem 404 transmits a tonal signal 310 comprising a single tone at 980 Hz with a V.34POS identification signal superimposed on the single tone, to identify the originate modem as a modem capable of performing a V.34POS fast train. Further, in one embodiment, the originate modem configures its receiver to receive S signal 355 (as defined below and in the ITU-T Recommendation V.34.) Preferably, tonal signal 310 is selected such that it would not disturb or interfere with other POS modulation or handshaking techniques in order to provide backward compatibility with the existing POS modulation or handshaking techniques and to provide fallback capability to proceed with the existing POS modulation or handshaking techniques if V.34POS is not supported by provider modem 120. In one embodiment, for example, a sequence of PP signals (defined below) may be transmitted at a low level relative to the 980 Hz tone to identify V.34POS capability without affecting operation of the existing POS modulation or handshaking techniques.

At the answer side, upon receiving the call from the originate modem, the answer modem goes off-hook and configures its receiver to detect tonal signal 310 comprising a tone at 980 Hz and V.34POS identification, at step 452.

Next, at step 454, the answer modem detects the single tone at 980 Hz and the V.34POS identification transmitted by the originate modem. In response, the answer modem transmits signal S 355 and signal S\ 360 indicating V.34POS capability and symbol rate. As defined in Section 5.2 of the ITU-T Recommendation V.34, the symbol rate or S=(a/c). 2400±0.01% two-dimensional (2D) symbols per second, where a and c are integers from the set specified in Table 1, in which symbol rates are shown rounded to the nearest integer.

TABLE 1

V.34POS- Symbol rates

| Symbol rate, S | a | c |
|---|---|---|
| 2400 | 1 | 1 |
| 2743 | 8 | 7 |
| 2800 | 7 | 6 |
| 3000 | 5 | 4 |
| 3200 | 4 | 3 |
| 3429 | 10 | 7 |

Signal S 355 is transmitted by alternating between point 0 of the quarter-superconstellation of FIG. 5 of the ITU-T Recommendation V.34 and the same point rotated counterclockwise by 90 degrees. Signal S\ 360 is transmitted by alternating between point 0 by 180 degrees and point 0 rotated counterclockwise by 270 degrees. Signal S 355 will end with the transmission of point 0 rotated counterclockwise by 90 degrees. Signal S\ 360 will begin with the transmission of point 0 rotated by 180 degrees. As shown in FIG. 3 and Table 2 below, signal S 355 is 256 T or about 80 ms (2400 baud)/107 ms (3200 baud) in duration, and signal S\ 360 is 16 T or about 5 ms (2400 baud)/7 ms (3200 baud) in duration. Spectrally, after modulation, signal S 355 and signal S\ 360 include three (3) tones, one at the carrier (center) frequency $f_c$, one at a $f_c+\frac{1}{2}T$ and one at $f_c-\frac{1}{2}T$. By analyzing the frequency content, or the period of signal S 355, the receiving modem may deduce the carrier frequency $f_c$ used by the transmitting modem as well as the symbol rate. The V34POS system may therefore be designed to either use a fixed combination of symbol rate and carrier frequency or allow the transmitter to pick a suitable combination without explicitly informing the receiver. As it follows, in one embodiment of the present invention, the answer modem does not transmit signal S 355 and signal S\ 360 and the V34POS process skips step 456.

TABLE 2

V.34POS- Sequence Timing

| Sequence | Symbols | Duration at 2400 Baud (ms) | Duration at 3200 Baud (ms) |
|---|---|---|---|
| S Signal | 256 | 107 | 80 |
| S\ Signal | 16 | 7 | 5 |
| Three PPs (Fast Train/Resynchronization) | 144 | 60 | 45 |
| PS (Parameter Sequence) | 32 | 13.3 | 10 |
| Scrambled 1's | 0 | 0 | 0 |
| Trellis decoder delay | 32 | 13.3 | 10 |
| Total | 480 | 200.6 | 150 |

It should be noted, unlike the existing modem startup techniques, in one embodiment, in order to expedite the training process, the answer modem and the originate modems do not transmit scrambled 1's during the training process. Rather, the modems use the PPs signal to initialize themselves. Further, in the embodiment described herein, for calculating the trellis decoder delay, the assumption is that the trellis decoder is 16 4-D symbols deep. Further, it should be noted that, in one embodiment of the present invention, described herein, the answer modem does not transmit an answer tone (2100 Hz or 2225 Hz) in order to expedite the training process. However, in some embodiments, an answer tone may be sent prior to transmitting signal S by the answer modem. In such embodiments, duration of the answer tone may be programmable at a predetermined increment, such as 100 ms increments. In other embodiments, a billing delay may also be introduced after the answer modem is placed off-hook at step 452, and the billing delay may also be programmable at a predetermined increment.

Continuing with FIGS. 3A, 3B and 4, after transmitting signal S\ 360 at step 456 (or in one embodiment, after detecting tonal signal 310 at step 454 ), the answer modem transmits a retrain and synchronization sequence, at step 458, by sending one or more PPs 365, e.g. three PPs, each of length 48 T, to allow either FFT-based fast train or a timing and carrier resynchronization. Further, at step 458, the answer modem trains its echo canceller, for example, if the answer modem desires to enter a possible full-duplex operation with the originate modem. At step 408, the originate modem trains its equalizer on three PPs transmitted by the answer modem. In one embodiment, it will be up to the originate modem to use a stored equalizer and resynchronize on the PPs at step 408 or to perform a fast train. As described in the ITU-T Recommendation V.34, signal PP 365 includes six periods of a 48-symbol sequence and is used by the receiving modem for training its equalizer. PP(i), i =0,1, . . . , 287 is defined as follows: Set I=4 k+I, where k=0, 1, 2, . . . , 71; and I=0, 1, 2, 3 for each k, then: PP(i)=$e^{jn(kI+4)/6}$ if k modulo 3=1, otherwise PP(i)=$e^{j\pi kI/6}$; where PP(0) is transmitted first. As shown in FIG. 3 and Table 2 below, three PPs are 144 T or about 45 ms (2400 baud)/60 ms (3200 baud) in duration.

Next, at step 460, the answer modem transmits parameter sequence (PS) 370 including a plurality of parameters, which can indicate the data rate and modulation parameters, and which can be used to initialize the equalizer delay line. In various embodiments of the present invention, parameter sequence 370 may include one or more of the following parameters: data rate choices, symbol rate choices, trellis coding choices, full-duplex options, transmit level adjustment, pre-emphasis and precoder taps. Further, at step 410, the originate modem receives parameter sequence 370 to initialize its equalizer delay line. As shown in FIG. 3 and Table 2 below, PS 370 is 32 T or about 10 ms (2400 baud)/13 ms (3200 baud) in duration.

After transmitting parameters sequence 370, at step 462, the answer modem transmits data 375 to the originate modem, and the originate modem receives data 375 at step 412. Further, at step 462, the answer modem also performs a fine training and evaluation of its echo canceller, for example, if the answer modem desires to enter a possible full-duplex operation with the originate modem. At the end of the data reception, at step 414, the originate modem transmits a retrain and synchronization sequence, by sending one or more PPs 315, e.g. three PPs, each of length 48 T, to allow either FFT-based fast train or a timing and carrier resynchronization. Further, at step 414, the originate modem trains its echo canceller, for example, if the originate modem desires to enter a possible full-duplex operation with the answer modem. At step 464, the answer modem trains its equalizer on three PPs 315 transmitted by the originate modem. In one embodiment, it will be up to the answer modem to use a stored equalizer and resynchronize on the PPs at step 464 or to perform a fast train. Signal PP 315 will have the same format and duration, as described above in conjunction with steps 458 and 408.

Next, at step 416, the originate modem transmits parameter sequence (PS) 320 including a plurality of parameters, which can indicate the data rate, modulation parameters and maximum receive rate, and which can be used to initialize the equalizer delay line. In various embodiment of the present invention, parameter sequence 320 may include one or more of the following parameters: data rate choices, symbol rate choices, trellis coding choices, full-duplex options, transmit level adjustment, pre-emphasis and precoder taps. Further, at step 466, the answer modem receives parameter sequence 320 to initialize its equalizer delay line. Signal PS 320 will have the same format and duration, as described above in conjunction with steps 460 and 410.

After transmission of parameter sequence 320 by the originate modem, at step 418, the originate modem transmits data 325 to the answer modem, and the answer modem receives data 325 at step 468. Further, at step 418, the originate modem also performs a fine training and evaluation of its echo canceller, for example, if the originate modem desires to enter a possible full-duplex operation with the answer modem. At the end of the data reception, at step 470, the answer modem transmits the retrain and synchronization sequence once again by sending one or more PPs 380, e.g. three PPs. At step 420, the originate modem receives and resynchronizes its receiver on the PPs 380. In one embodiment, the receiver may be resynchronized as described in U.S. Pat. No. 5,870,438, entitled "Fast Resynchronization System for High-Speed Data Transmission", which is hereby incorporated by reference.

Next, at step 472, according to one embodiment of the present invention, as shown in FIG. 3A, the answer modem transmits PSfd signal 382 to indicate to the originate modem that the answer modem is capable of performing full-duplex data transfer, i.e. receive and transmit data simultaneously. In some embodiments, the answer modem may transmit PS signal 383, as shown in FIG. 3B, to indicate to the originate modem that the answer modem would like to remain in the half-duplex data transfer, either because the answer modem does not support full-duplex capability or simply intends to establish a half-duplex data operation even though it is capable of supporting a full-duplex data operation as well.

Following step 472, at step 473, the answer modem transmits data 390 to the originate modem. After receiving data 390 by the originate modem at step 423, the originate modem moves to step 424 of the fast train process to transmit one or more PPs 330, e.g. three PPs, to the answer modem once again. Next, at step 474, the answer modem receives and resynchronizes its receiver on PPs 330, as described above in conjunction with step 420. In one embodiment, after transmitting PP signals 330, the originate modem moves to step 426, where the originate modem transmits PSfd signal 332, as shown in FIG. 3A, to the answer modem indicating that the originate modem is capable of supporting the full-duplex data operation. In other embodiments, the originate modem may not move to step 426, but instead move to step 428 and transmit PS signal 333, as shown in FIG. 3B, to the answer modem, either because the originate modem does not support full-duplex capability, or it did not receive PSfd signal 332 from the answer modem, or it intends to establish a half-duplex data operation even though it is capable of supporting a full-duplex data operation.

At this juncture of the fast train process, the answer modem moves to step 476 upon receiving PSfd signal 332 from the originate modem, and thereafter proceeds to full-duplex data mode step 499, and similarly, the originate modem, after transmitting PSfd signal 332 at step 426, moves to full-duplex data mode step 499. Alternatively, the answer modem moves to step 478 upon receiving PS signal 333 from the originate modem, and thereafter proceeds to receive data 340, and similarly, the originate modem, after transmitting PS signal 333 at step 428, moves to step 430 to transmit data 340 to the answer modem. In the half-duplex mode of operation, the originate modem and the answer modem continue alternating the transmit and receive directions, wherein the modems do not transmit a PSfd signal.

The methods and systems presented above may reside in software, hardware, and/or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A fast train method for use by a point of sale (POS) modem capable of use by a POS terminal to connect to a remote modem over a communication line, said fast train method comprising:

receiving an instruction to connect to said remote modem;

dialing a telephone number for said remote modem in response to said receiving said instruction;

transmitting a tonal signal to said remote modem for a pre-determined period of time after said dialing said telephone number, wherein said tonal signal identifies said POS modem as being capable of supporting said fast train method;

receiving an S signal from said remote modem in response to said transmitting;

receiving an S\ signal from said remote modem following said receiving said S signal;

receiving one or more remote PP signals from said remote modem following said receiving said S\ signal; and receiving a remote parameter sequence from said remote modem following said receiving said one or more remote PP signals.

2. The fast train method of claim 1, wherein said tonal signal is a single frequency 980 Hz tone with a V.34POS identification superimposed on said single frequency 980 Hz tone.

3. The fast train method of claim 1, wherein said receiving said one or more remote PP signals includes receiving three PP signals.

4. The fast train method of claim 1, wherein said POS modem includes an equalizer, and wherein said fast train method further comprises: training said equalizer on said one or more remote PP signals.

5. The fast train method of claim 1, wherein said remote parameter sequence includes one or more of the following parameters: remote data rate choices, remote symbol rate choices, remote trellis coding choices, remote full-duplex options, remote transmit level adjustment, remote pre-emphasis and remote precoder taps.

6. The fast train method of claim 1 further comprising: receiving remote data from said remote modem following said receiving said remote parameter sequence.

7. The fast train method of claim 6 further comprising: transmitting one or more POS PP signals to said remote modem following said receiving said remote data.

8. The fast train method of claim 7, wherein said POS modem includes an echo canceller, and wherein said fast train method further comprises: training said echo canceller during said transmitting said one or more POS PP signals.

9. The fast train method of claim 7, wherein said one or more POS PP signals are capable of use by said remote modem to train an equalizer of said remote modem.

10. The fast train method of claim 7 further comprising: transmitting a POS parameter sequence to said remote modem following said transmitting said one or more POS PP signals.

11. The fast train method of claim 10, wherein said POS parameter sequence includes one or more of the following parameters: POS data rate choices, POS symbol rate choices, POS trellis coding choices, POS full-duplex options, POS transmit level adjustment, POS pre-emphasis and POS precoder taps.

12. The fast train method of claim 10 further comprising: transmitting POS data to said remote modem following said transmitting said POS parameter sequence.

13. The fast train method of claim 12 further comprising: fine training and evaluating said echo canceller during said transmitting said POS data.

14. The fast train method of claim 12 further comprising: receiving said one or more remote PP signals from said remote modem after said transmitting said POS data.

15. The fast train method of claim 14 further comprising: receiving a remote PSfd from said remote modem following said receiving said one or more remote PP signals from said remote modem after said transmitting said POS data.

16. The fast train method of claim 15 further comprising: receiving remote data from said remote modem, and transmitting said one or more POS PP signals to said remote modem after said receiving said remote data.

17. The fast train method of claim 16 further comprising: transmitting a POS PSfd following said transmitting said one or more POS PP signals to said remote modem after said receiving said remote PSfd.

18. The fast train method of claim 17 further comprising: entering a full-duplex data mode.

19. The fast train method of claim 1 further comprising: extracting a carrier frequency and symbol rate from said S signal.

20. A fast train method for use by a remote modem capable of communicating with a point of sale (POS) modem over a communication line, said POS modem being in communication with a POS terminal, said fast train method comprising:

receiving a call from said POS modem;

receiving a tonal signal from said POS modem for a pre-determined period of time following said receiving said call, wherein said tonal signal identifies said POS modem as being capable of supporting said fast train method;

transmitting an S signal to said POS modem in response to said receiving said tonal signal;

transmitting an S\ signal to said POS modem following said transmitting said S signal;

transmitting one or more remote PP signals to said POS modem following said transmitting said S\ signal; and transmitting a remote parameter sequence to said POS modem following said transmitting said one or more remote PP signals.

21. The fast train method of claim 20 further comprising: going off-hook in response to receiving said call from said POS modem.

22. The fast train method of claim 20, wherein said tonal signal is a single frequency 980 Hz tone with a V.34POS identification superimposed on said single frequency 980 Hz tone.

23. The fast train method of claim 20, wherein said transmitting said one or more remote PP signals includes transmitting three PP signals.

24. The fast train method of claim 20, wherein said remote modem includes an echo canceller, and wherein said fast train method further comprises: training said echo canceller during said transmitting said one or more remote PP signals.

25. The fast train method of claim 24 further comprising:
transmitting remote data to said POS modem following said transmitting said remote parameter sequence; and
fine training and evaluating said echo canceller during said transmitting said remote data.

26. The fast train method of claim 20, wherein said remote parameter sequence includes one or more of the following parameters: remote data rate choices, remote symbol rate choices, remote trellis coding choices, remote full-duplex options, remote transmit level adjustment, remote pre-emphasis and remote precoder taps.

27. The fast train method of claim 20 further comprising: receiving one or more POS PP signals from said POS modem following said transmitting said remote data.

28. The fast train method of claim 27, wherein said remote modem includes an equalizer, and wherein said fast train method further comprises: training said equalizer on said one or more POS PP signals.

29. The fast train method of claim 27, wherein said POS modem has an echo canceller, and wherein said POS modem trains said equalizer during said receiving said one or more POS PP signals by said remote modem.

30. The fast train method of claim 27 further comprising: receiving a POS parameter sequence from said POS modem following said receiving said one or more POS PP signals.

31. The fast train method of claim 30, wherein said POS parameter sequence includes one or more of the following parameters: POS data rate choices, POS symbol rate choices, POS trellis coding choices, POS full-duplex options, POS transmit level adjustment, POS pre-emphasis and POS precoder taps.

32. The fast train method of claim 30 further comprising: receiving POS data from said POS modem following said receiving said POS parameter sequence.

33. The fast train method of claim 32 further comprising: transmitting said one or more remote PP signals to said POS modem after said receiving said POS data.

34. The fast train method of claim 33 further comprising: transmitting a remote PSfd to said POS modem following said transmitting said one or more remote PP signals to said POS modem after said receiving said POS data.

35. The fast train method of claim 34 further comprising: receiving said one or more POS PP signals from said POS modem after said transmitting said remote PSfd.

36. The fast train method of claim 35 further comprising: receiving a POS PSfd following said receiving said one or more POS PP signals from said POS modem after said transmitting said remote PSfd.

37. The fast train method of claim 36 further comprising: entering a full-duplex data mode.

38. A point of sale (POS) modem capable of use by a POS terminal to connect to a remote modem over a communication line using a fast train protocol, said POS modem comprising:
a controller in communication with said POS terminal over a POS terminal interface, said controller being configured to receive an instruction from said POS terminal to connect to said remote modem and configured to dial a telephone number for said remote modem in response to said instructions;
a digital signal processor in communication with said controller, said digital signal processor including:
a transmitter configured to transmit a tonal signal to said remote modem for a pre-determined period of time after said controller dials said telephone number, wherein said tonal signal identifies said POS modem as being capable of supporting said fast train method; and
a receiver configured to receive an S signal from said remote modem in response to said transmitter transmitting said tonal signal, said receiver further configured to receive an S\ signal from said remote modem following said receiver receiving said S signal, said receiver further configured to receive one or more remote PP signals from said remote modem following said receiver receiving said S\ signal, and said receiver further configured to receive a remote parameter sequence from said remote modem following said receiver receiving said one or more remote PP signals.

39. The POS modem of claim 38, wherein said tonal signal is a single frequency 980 Hz tone with a V.34POS identification superimposed on said single frequency 980 Hz tone.

40. The POS modem of claim 38, wherein said one or more remote PP signals includes three PP signals.

41. The POS modem of claim 38, wherein said digital signal processor further includes an equalizer, and wherein said digital signal processor trains said equalizer on said one or more remote PP signals.

42. The POS modem of claim 38, wherein said remote parameter sequence includes one or more of the following parameters: remote data rate choices, remote symbol rate choices, remote trellis coding choices, remote full-duplex options, remote transmit level adjustment, remote pre-emphasis and remote precoder taps.

43. The POS modem of claim 38, wherein said receiver is further configured to receive remote data from said remote modem following said receiver receiving said remote parameter sequence.

44. The POS modem of claim 43, wherein said transmitter is further configured to transmit one or more POS PP signals to said remote modem following said receiver receiving said remote data.

45. The POS modem of claim 44, wherein said digital signal processor includes an echo canceller, and wherein said digital signal processor trains said echo canceller during said transmitter transmitting said one or more POS PP signals.

46. The POS modem of claim 44, wherein said one or more POS PP signals are capable of use by said remote modem to train an equalizer of said remote modem.

47. The POS modem of claim 44, wherein said transmitter is further configured to transmit a POS parameter sequence to said remote modem following said transmitter transmitting said one or more POS PP signals.

48. The POS modem of claim 47, wherein said POS parameter sequence includes one or more of the following parameters: POS data rate choices, POS symbol rate choices, POS trellis coding choices, POS full-duplex options, POS transmit level adjustment, POS pre-emphasis and POS precoder taps.

49. The POS modem of claim 47, wherein said transmitter is further configured to transmit POS data to said remote modem following said transmitter transmitting said POS parameter sequence.

50. The POS modem of claim 49, wherein said digital signal processor performs fine training and evaluating of said echo canceller during said transmitter transmitting said POS data.

51. The POS modem of claim 49, wherein said receiver is further configured to receive said one or more remote PP signals from said remote modem after said transmitter transmitting said POS data.

52. The POS modem of claim 51, wherein said receiver is further configured to receive a remote PSfd from said remote modem following said receiver receiving said one or more remote PP signals from said remote modem after said transmitter transmitting said POS data.

53. The POS modem of claim 52, wherein said transmitter is further configured to transmit said one or more POS PP signals to said remote modem after said receiver receiving said remote PSfd.

54. The POS modem of claim 53, wherein said transmitter is further configured to transmit a POS PSfd following said transmitter transmitting said one or more POS PP signals to said remote modem after said receiver receiving said remote PSfd.

55. The POS modem of claim 54, wherein said digital signal processor enters a full-duplex data mode.

56. A computer program product capable of performing a fast train method for use by a point of sale (POS) modem capable of use by a POS terminal to connect to a remote modem over a communication line, said computer program product comprising:
   code for receiving an instruction to connect to said remote modem;
   code for dialing a telephone number for said remote modem in response to said receiving said instruction;
   code for transmitting a tonal signal to said remote modem for a pre-determined period of time after said dialing said telephone number, wherein said tonal signal identifies said POS modem as being capable of supporting said fast train method;
   code for receiving an S signal from said remote modem in response to said transmitting;
   code for receiving an S\ signal from said remote modem following said receiving said S signal;
   code for receiving one or more remote PP signals from said remote modem following said receiving said S\ signal; and
   code for receiving a remote parameter sequence from said remote modem following said receiving said one or more remote PP signals.

57. The computer program product of claim 56 further comprising: code for receiving remote data from said remote modem following said receiving said remote parameter sequence.

58. The computer program product of claim 57 further comprising: code for transmitting one or more POS PP signals to said remote modem following said receiving said remote data.

59. The computer program product of claim 58, wherein said POS modem includes an echo canceller, and wherein said computer program product further comprises: code for training said echo canceller during said transmitting said one or more POS PP signals.

60. A fast train method for use by a point of sale (POS) modem capable of use by a POS terminal to connect to a remote modem over a communication line, said fast train method comprising:
   receiving an instruction to connect to said remote modem;
   dialing a telephone number for said remote modem in response to said receiving said instruction;
   transmitting a tonal signal to said remote modem for a pre-determined period of time after said dialing said telephone number, wherein said tonal signal identifies said POS modem as being capable of supporting said fast train method;
   receiving one or more remote PP signals from said remote modem in response to said transmitting; and
   receiving a remote parameter sequence from said remote modem following said receiving said one or more remote PP signals.

61. The fast train method of claim 60, wherein said tonal signal is a single frequency 980 Hz tone with a V.34POS identification superimposed on said single frequency 980 Hz tone.

62. The fast train method of claim 60, wherein said receiving said one or more remote PP signals includes receiving three PP signals.

63. The fast train method of claim 60, wherein said POS modem includes an equalizer, and wherein said fast train method further comprises: training said equalizer on said one or more remote PP signals.

64. The fast train method of claim 60, wherein said remote parameter sequence includes one or more of the following parameters: remote data rate choices, remote symbol rate choices, remote trellis coding choices, remote full-duplex options, remote transmit level adjustment, remote pre-emphasis and remote precoder taps.

65. The fast train method of claim 60 further comprising: receiving remote data from said remote modem following said receiving said remote parameter sequence.

66. The fast train method of claim 65 further comprising: transmitting one or more POS PP signals to said remote modem following said receiving said remote data.

67. The fast train method of claim 66, wherein said POS modem includes an echo canceller, and wherein said fast train method further comprises: training said echo canceller during said transmitting said one or more POS PP signals.

68. A point of sale (POS) modem capable of use by a POS terminal to connect to a remote modem over a communication line using a fast train protocol, said POS modem comprising:
   a controller in communication with said POS terminal over a POS terminal interface, said controller being configured to receive an instruction from said POS terminal to connect to said remote modem and configured to dial a telephone number for said remote modem in response to said instruction;
   a digital signal processor in communication with said controller, said digital signal processor including:
     a transmitter configured to transmit a tonal signal to said remote modem for a pre-determined period of time after said controller dials said telephone number, wherein said tonal signal identifies said POS modem as being capable of supporting said fast train method; and a receiver configured to receive one or more remote PP signals from said remote modem in response to said transmitter transmitting said tonal signal, and said receiver further configured to receive a remote parameter sequence from said remote modem following said receiver receiving said one or more remote PP signals.

69. The POS modem of claim 68, wherein said tonal signal is a single frequency 980 Hz tone with a V.34POS identification superimposed on said single frequency 980 Hz tone.

70. The POS modem of claim 68, wherein said one or more remote PP signals includes three PP signals.

71. The POS modem of claim 68, wherein said digital signal processor further includes an equalizer, and wherein said digital signal processor trains said equalizer on said one or more remote PP signals.

72. The POS modem of claim 68, wherein said remote parameter sequence includes one or more of the following parameters: remote data rate choices, remote symbol rate choices, remote trellis coding choices, remote full-duplex options, remote transmit level adjustment, remote pre-emphasis and remote precoder taps.

73. The POS modem of claim 68, wherein said receiver is further configured to receive remote data from said remote modem following said receiver receiving said remote parameter sequence.

74. The POS modem of claim 73, wherein said transmitter is further configured to transmit one or more POS PP signals to said remote modem following said receiver receiving said remote data.

75. The POS modem of claim 74, wherein said digital signal processor includes an echo canceller, and wherein said digital signal processor trains said echo canceller during said transmitter transmitting said one or more POS PP signals.

76. The POS modem of claim 74, wherein said one or more POS PP signals are capable of use by said remote modem to train an equalizer of said remote modem.

77. The POS modem of claim 74, wherein said transmitter is further configured to transmit a POS parameter sequence to said remote modem following said transmitter transmitting said one or more POS PP signals.

78. The POS modem of claim 77, wherein said POS parameter sequence includes one or more of the following parameters: POS data rate choices, POS symbol rate choices, POS trellis coding choices, POS full-duplex options, POS transmit level adjustment, POS pre-emphasis and POS precoder taps.

* * * * *